3,268,478
META-POLYPHENOXYLENE POLYMERS
Gordon P. Brown, Schenectady, N.Y., and Roswell J. Blackinton, Whittier, Calif., assignors to General Electric Company, a corporation of New York
No Drawing. Filed Jan. 2, 1962, Ser. No. 163,866
11 Claims. (Cl. 260—47)

This invention relates generally to the preparation of novel polyphenoxylene composition. More particularly, the invention relates to the preparation of linear phenoxylene homopolymers consisting essentially of repeating units of an unsubstituted phenoxylene radical. Specifically, the invention pertains to the preparation of m-phenoxylene homopolymers having thermal stability over a wide range of temperatures coupled with excellent physical and dielectric properties such as to make the compositions useful at high temperatures for such diverse applications as thermal and electrical insulation, heat-transfer media, etc.

Polyphenoxylene homopolymers are known which comprise the reaction product involving the hydrogen atom of the phenolic group of one phenol molecule and a hydrogen, chlorine, bromine, or iodine substituent in the ortho- or para-position of another phenol molecule and resulting in a chain formation having preponderance of ortho- and para-oriented phenoxylene linkages. For example, polyphenoxylene homopolymers are disclosed in the prior application of Allan S. Hay, entitled, "Oxidation of Phenols," Serial No. 69,245, filed November 15, 1960, and assigned to the assignee of the present invention, which are high molecular weight thermoplastic products with elevated softening points that can be cured to an infusible state dependent upon the conditions of preparation. More recently, other polyphenoxylene homopolymers have been disclosed by D. H. Golden which are formed by self-condensation of the alkali metal salts of p-halogenophenols in the presence of oxidative catalysts such as iodine, the products also possessing considerable thermal stability, good chemical resistance, and softening points in excess of 200° C. While the thermal stability of the known polyphenylene oxide materials is excellent compared to other polymers generally, it would still be desrable to improve the thermal stability of the polymer in view of the current trend toward higher operating temperatures in many applications. One method for improving the thermal stability of polyphenoxylene polymers is to reduce the number of any substituents attached to the benzene ring or attached to the repeating phenylene radicals since such substituents provide sites for thermal degradation. Realizing this, unsubstituted p-oriented polyphenoxylene homopolymers have been prepared having further improved thermal stability but as yet none possess the desired insensitivity in air at elevated temperatures of 300–400° C. and higher.

It is an important object of the invention, therefore, to provide polyphenoxylene homopolymers having improved thermal stability at elevated temperatures up to around 500° C.

It is another important object of the invention to provide a new class of linear meta-oriented polyphenoxylene homopolymers.

It is still another important object of the invention to provide meta-oriented polyphenoxylene homopolymers having improved thermal stability together with other physical, chemical, and electrical properties so as to be useful in high temperature applications.

Still another important object of the invention is to provide novel methods for the preparation of meta-oriented polyphenoxylene homopolymers.

Briefly, the meta-oriented polyphenoxylene homopolymers of the invention are prepared by self-condensation of an alkali metal salt of an m-halogenophenol in the presence of a suitable copper catalyst under anhydrous conditions. The molecular weight of the homopolymers may vary between 2,000 to 10,000 and higher with flow points generally ranging from about 60–150° C. at these molecular weights. The homopolymers are thermoplastic in nature and are also soluble in the usual organic solvents such as benzene, toluene, xylene, chloroform, and acetone. While the flow points of these homopolymers appear to be a limiting factor in high temperature utility, it is expected that the materials can be further reacted to an infusible state by a cross-linking mechanism involving terminal functional groups of the homopolymer. The end groups serve as one important means of distinguishing the materials from other known polyphenoxylene materials having non-functional end groups, such as the phenoxy and phenyl radicals. The chemical structure of the present meta-oriented polyphenoxylene homopolymers can be represented by the following general formula

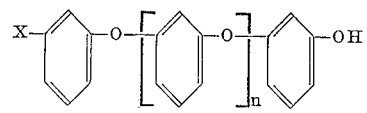

wherein X is a halogen atom and $n$ is an integer generally of at least 10. The halogen atom in the structure is not critical, any of the suitable bromophenols, chlorophenols, iodophenols, or fluorophenols condense to form the desired homopolymers.

Homopolymers having the above general structure with an $n$ value less than 10 soften at room temperature and below so as not to be as utilizable for certain applications as the higher molecular weight polymers. Cross-linked infusible solids provided by reacting the terminal groups of the low molecular weight homopolymers with suitable cross-linking agents can lead to the formation of brittle products. In contrast thereto, the higher molecular weight homopolymers of the invention are amorphous in character so that the materials are expected to provide more flexible casting resins, impregnating compounds, adhesives, and the like.

For the preparation of a linear unsubstituted amorphous polymer having the described characteristics, it is necessary to prevent side reactions and chain termination during the polymerization process. Linear chain growth proceeds normally if there is no substantial ionization of the monomer salt. Monomer ionization is minimized when the polymerization is conducted under anhydrous conditions and in the absence of any ionizing solvent. Chain termination is possible with the presence in the reaction medium of monomer precursor materials and impurities, such as phenol, dibromobenzene, and any alkali metal phenolate, so that it is advisable to conduct the polymerization with a reasonably pure monomer salt. The side reactions which tend to produce insoluble intractable three-dimensional polymers are avoided by the same precautions taken to exercise chain growth together with control of catalyst addition. Adding the catalyst to the polymerization mixture below certain temperatures minimizes formation of low molecular weight cyclic oligomers. Polymerization temperatures and reaction time are additional factors influencing the molecular weight and linearity of the polymerizates.

In accordance with one preferred method for preparation of linear meta-oriented polyphenoxylene homopolymers, an alkali metal salt of a monohydric metahalogenophenol is first prepared in an azeotropic reaction mixture and the salt thereafter condensed directly under anhydrous conditions and in the presence of a suitable copper catalyst by solution polymerization techniques. The azeotropic reaction mixture is employed to remove any water present in the system and is formed between water and an azeotroping agent generally added as a solvent for one of the reactants. In a modification of the preferred method, a second mixture is formed after removal of water from the reaction mixture between the azeotroping agent employed for water removal and a higher boiling solvent whereupon polymerization is then carried out at a more elevated temperature intermediate between the constant boiling point of the azeotropic mixture and the boiling point of the higher boiling solvent. Since regulation of polymerization temperatures in the range 150–220° C. is required for the preparation of linear polymers with a minimum of side reaction products suitable azeotroping agents and higher boiling solvents may be selected from a relatively broad class of non-ionizing organic liquid solvents for the polymerizate. The term "non-ionizing" employed to define the solvents refers to non-polar liquids which undergo no substantial ionization nor ionize the monomer in the reaction mixture. The effects of exothermic reaction commonly experienced in the polymerization reaction are minimized during the modified process by reason of the excess heat capacity provided by the solvents.

In another preferred method of polymerization, a preformed alkali metal salt of a monohydric m-halogenophenol is condensed unded anhydrous conditions and in the presence of a suitable copper catalyst by bulk polymerization techniques. The method increases the yield of desired polymer compared to solution polymerization techniques employing certain solvents possibly by way of minimizing side reactions of the salt and/or polymerizate with the particular solvent. Suitable bulk polymerization conditions for preparation of a linear homopolymer comprise heating the alkali metal salt until molten for effective mixing with the catalyst, adding a copper catalyst to the molten salt at temperatures below approximately 100° C. and continuing to heat the polymerization mixture to temperatures in the approximate range 150–200° C. for a sufficient time period to produce a homopolymer of desired molecular weight. The reaction is carried out in a suitable container equipped to conduct polymerization under anhydrous conditions by such known means as vacuum, protective atmosphere, etc. Relatively high molecular weight homopolymers are produced with both solution polymerization and bulk polymerization techniques in time periods ranging between 2–74 hours at the indicated polymerization temperatures with a longer time period generally providing higher molecular weight products.

Suitable phenol precursor materials for preparation of the alkali metal salt monomer can be selected from the class of hydroxybenzene compounds substituted in one meta-position with a halogen atom. Monomer precursor materials can be more particularly characterized as substituted monohydric phenols having a single reactive chlorine, bromine, iodine, or fluorine atom in the meta-ring position preferably attached directly to the aromatic nucleus. Substituted dihydric phenols are unsatisfactory monomer precursor materials since the alkali metal salts thereof undergo side reaction during the polymerization process which produce low molecular weight products, including cyclic oligomers and other undesirable nonlinear polymers. Preferred precursor materials may further be characterized by the complete absence of all hydrocarbon groups attached to the aromatic nucleus, such organic substituents having been found to reduce thermal stability of the resulting homopolymers. Suitable monohydric phenol precursor materials include meta-substituted halogenophenols such as 3-chlorophenol, 3-bromophenol, and 3-iodophenol, meta-substituted halohydrocarbon phenols such as 3-iodophenylphenol, and meta-substituted halohydrocarbonoxy phenols such as 3-iodophenoxyphenol. The monohalogenophenols are the preferred precursor materials by reason of producing homopolymers in good yield having thermal stability at 450° C. such that less than 3% of the polymer is volatilized over periods as long as one hour.

Suitable copper catalyst for the polymerization process can be selected from the class of copper compounds including copper which do not promote ionization of the monomer during the polymerization process. Examples of suitable catalysts include copper, copper oxide, and copper alloys but ionic copper compounds such as cuprous and cupric salts are deemed excludable by reason of being ionic in nature which promotes undesired ionization of the monomer. The preferred catalyst material is finely divided copper which can be mixed with the monomer in conventional fashion for uniform polymerization to produce the high molecular weight homopolymers free of any side reaction products and in good yield.

The invention can be practiced in its preferred embodiments as illustrated in the following examples and subsequent discussion thereon. Where parts and percentages appear hereinafter in the specification and claims, the reference is to parts and percentages by weight unless otherwise specified.

*Example 1*

A 1 liter 3-neck round bottom flask equipped with thermometer, nitrogen inlet tube, stirrer, and reflux condenser fitted with a Dean-Stark trap was charged with approximately 500 cc. of benzene azeotroping agent, 0.5 gram-mole of m-bromophenol, and 0.5 gram-mole of potassium hydroxide. The m-bromophenol had been purified prior to use as a reactant by distillation followed by trituration with ether and drying the normally solid phenol to remove the ether. The reaction mixture was heated with stirring to the reflux temperature forming the alkali metal salt of the phenol, and heating at reflux was continued for a period of approximately 3 to 4 hours whereby the theoretical amount of water from the salt reaction was collected and the alkali salt product had precipitated from the reaction mixture. Approximately 1 gram of powdered copper catalyst was added to the reaction mixture along with 200–300 cc. of phenyl ether and the mixture further heated to reflux at approximately 180° C. After continued heating at the reflux temperature for a period of approximately 1–2 hours, all of the metal salt had dissolved and solution polymerization of the mixture was completed at this temperature under anhydrous conditions produced by blanketing the reaction mixture with a slow stream of nitrogen for a period of 4–5 hours. The homopolymer product was isolated by adding benzene to the reaction mixture followed by filtering to remove inorganic halide and copper, removing the benzene by distillation, and precipitating the polymer from the reaction mixture as an oily layer by adding methanol. The oily product was next dissolved in benzene, precipitated with methanol, washed several times by decantation with additional methanol, and dried under vacuum.

The separated homopolymer was an amorphous solid having a flow point around 100° C. A chemical microanalysis of the polymer indicated approximately 77.07% carbon, 4.13% hydrogen, and 1.32% bromine, with the remainder presumed to be 17.48% oxygen by difference. An active hydrogen value of 0.04% was determined by end-group analyses in conventional fashion employing a method disclosed in greater detail by S. Siggia in "Quantitative Organic Analysis via Functional Groups," John Wiley and Sons, Inc., New York (1949), page 4. Calculation of the polymer molecular weight from the active hydrogen end-group analysis indicated a value of 3300 which correlates well with a value of 3,000 calculated from the bromine content of the polymer. Additional molecular weight determinations for the polymer made by conventional vapor pressure osmotic measurement and cryoscopic examination resulted in values of 2700 and 3000, respectively, which values are also in close agreement with values obtained by the active end-group analyses.

*Example 2*

To illustrate the preparation of linear unsubstituted m-phenoxylene homopolymers by condensation of a different alkali metal salt of a monohydric m-halogenophenol, sodium m-bromophenoxide was polymerized by the same general solution polymerization method described in the preceding example. Accordingly, the sodium salt was prepared by reacting 0.5 gram-mole of sodium hydroxide with 0.5 gram-mole of m-bromophenol in 500 cc. of benzene azeotroping agent and the reaction mixture stirred at a reflux temperature of approximately 80° C. until the water of formation had been removed and the sodium salt precipitated in the reaction flask. The m-bromophenol reactant was purified prior to addition in the reaction mixture by means of fractional extraction with base from a benzene/ether solution until a colorless solution had been obtained. The alkali salt was condensed in the reaction mixture with continued heating followed by addition of 1 gram of powdered copper and 200–300 cc. of diphenyl to the mixture. The polymerization reaction was carried out for a period of approximately 48 hours at a reaction temperature of approximately 170° C. under anhydrous conditions whereupon the reaction mixture was cooled and a homopolymer product separated in the same manner as described in Example 1.

An amorphous solid linear homopolymer of poly-(m-phenoxylene) was obtained having a flow point around 75° C. The homopolymer was soluble in such common organic liquids as chloroform, benzene, xylene, toluene, and phenyl ether. The molecular weight of the homopolymer determined by vapor pressure osmotic measurement was approximately 2200.

*Example 3*

To illustrate preparation of a linear m-phenoxylene homoploymer with a different catalyst potassium m-bromophenoxide was self-condensed according to the same general method described in Example 1 with an equivalent amount of cuprous oxide for the catalyst. After polymerization of the reaction mixture at approximately 150° C. for a period of about 60 hours, a linear homopolymer of m-phenoxylene was obtained having a molecular weight determined by vapor pressure osmotic measurement of approximately 1400.

*Example 4*

An alternate solution polymerization technique yielding even higher molecular weight linear m-phenoxylene homopolymers is illustrated to point out further compositions within contemplation of the invention.

A 1 liter, four-neck, round bottom flask was modified by sealing a sintered glass filter plate closed off by a stop-cock into the bottom of the flask. The modified flask was equipped with a stirrer, reflux condenser having a Dean-Stark trap, thermometer, nitrogen inlet tube, and dropping funnel. Into this flask there was introduced approximately 90 grams m-bromophenol dissolved in an equi-part benzene/ether mixture and the m-bromophenol was extracted under a protective nitrogen blanket in the flask with successive portions of aqueous sodium hydroxide until a total of approximately 20 mole percent of the mixture had been extracted and the remaining m-bromophenol solution was colorless in appearance. Approximately 0.4 gram-mole of potassium hydroxide was added to the mixture to produce the alkali metal salt followed by removal of ether by distillation. Further heating of the mixture to 80° C. produced azeotropic distillation of the theoretical quantity of water formed during the salt reaction whereupon heating was discontinued and the salt product washed with benzene for greater purification. Approximately 200–300 cc. of phenyl ether were added to the mixture together with 1 gram of powdered copper catalyst and the mixture heated to approximately 120° C. for 48 hours which resulted in little evidence of any reaction having taken place. Thereupon, the temperature of the mixture was raised to 150° C. for polymerization and the reaction continued for a period of approximately 18 hours.

An amorphous solid product was obtained having a flow point of approximately 120° C. The intrinsic viscosity for the homopolymer was found to be 0.13 as compared to a value of approximately 0.05 for the homopolymer of Example 1. The molecular weight of the homopolymer obtained from hydroxyl and group analyses was in excess of 4000. Chemical microanalysis of the product indicated 78.60% carbon, 4.61% hydrogen, traces of both bromine and active hydrogen end groups with the remainder again presumed to be oxygen by difference.

*Example 5*

To illustrate the preparation of homopolymer products of the invention with still other monomers, commercial grade m-chlorophenol was self-condensed by solution polymerization in accordance with the general method described in Example 1. The polymerization reaction was maintained in the approximate temperature range 150–170° C. under anhydrous conditions and in the presence of a suitable copper catalyst for a period of approximately 18 hours whereupon a linear homopolymer with a molecular weight measured by hydroxyl end-group analysis of approximately 2500 was obtained.

*Example 6*

The addition of a suitable copper catalyst in the polymerization reaction mixture above certain temperatures produces undesirably lower molecular weight polymers. In illustration, an anhydrous potassium salt monomer was dissolved in tetrahydrofuran and the solution divided into approximately equal fractions for separate polymerization by the general method described in Example 1. One fraction was added dropwise to a refluxing benzene with concurrent distillation of the tetrahydrofuran. A high boiling benzophenone solvent was added for the polymerization together with copper catalyst at a mixture temperature about 80° C. The reaction mixture was further heated to temperatures in the approximate range 200–220° C. for a period of approximately 16 hours to complete the polymerization which resulted in a polymer molecular weight of approximately 2100. In contrast thereto, the polymeric product obtained from the second fraction polymerized under the same conditions except that the copper catalyst was added at a reaction temperature of 180° C. and found to have a molecular weight around 1100.

*Example 7*

To further illustrate the effect of catalyst addition temperatures on still different monomers, the dimer of m-bromophenol was polymerized under approximately the same conditions described in Example 6. Accordingly, 3-bromophenyl 3'-hydroxyphenyl ether was first converted into the anhydrous potassium salt separately and the salt dissolved in tetrahydrofuran to form approximately equal fractions. The monomer solutions were thereafter polymerized separately after being added to refluxing benzene for removal of the tetrahydrofuran solvent which was followed by admixture of benzophenone and distillation of the benzene as hereinbefore described. In the polymerization of one fraction, copper catalyst was added at approximately 80 C. while in the second fraction the catalyst was added when the temperature of the reaction mixture reached approximately 180° C. The molecular weight of the polymeric product obtained from lower temperature catalyst addition was approximately 2500 as compared to the molecular weight of 1800 for the polymeric product obtained with higher temperature catalyst addition.

*Example 8*

A linear homopolymer of the invention was prepared by a bulk polymerization technique wherein potassium m- phenoxide was first fused by heating in an enclosed container equipped with oil bath heating means to a temperature of approximately 80° C. and an effective amount of powder copper then mixed in the molten salt to initiate self-condensation. The polymerization mixture was further heated to temperatures in the range 165–170° C. for a period of approximately 64 hours to complete the polymerization and the mixture thereafter cooled to room temperature for recovery of the polymer. The molecular weight of the polymeric product measured by vapor pressure osmotic determination was approximately 2000.

*Example 9*

A linear homopolymer of the invention was prepared by a modified polymerization technique initially involving solution polymerization followed by removal of the solvent and subsequent completion of the reaction by bulk polymerization. In accordance with this method, 0.5 gram-mole of commercial m-chlorophenol, 0.5 gram-mole of potassium hydroxide, and 1 gram of powdered copper were added to a reaction flask containing 200–300 cc. of phenyl ether and the contents heated to 175° C. Water of formation was distilled from the reaction mixture as formed and the polymerization was continued for approximately 16 hours at 175° C. in the phenyl ether solvent. At the end of this period, the phenyl ether was distilled from the heated reaction mixture under reduced pressure and bulk polymerization continued in the molten reaction solids at 175° C. for an additional 72 hours to complete the reaction.

The molecular weight of the amorphous linear solid polymer formed in this manner was determined both by vapor pressure osmotic measurement and chlorine end-group analysis and found to be 5500 and 5900, respectively. The melting behavior of the polymer indicated slight softening in the temperature range 77–85° C. and a flow point of approximately 105° C.

Dielectric measurements at room temperature were conducted on a molded disk of the above polymer having an approximate 0.061 inch thickness. Silver electrodes were deposited on the major surfaces of the disk for volume resistivity, dielectric constant, and dissipation factor determination. The volume resistivity measurement was conducted with a Keithley electrometer at 500 volts D.C., whereas the remaining dielectric characteristics were determined at 60 cycles per second with a General Electric Schering bridge, at 1 kilocycle with a Wayne Kerr Type B221 bridge, and at 1 megacycle with a Wayne Kerr Type B601 bridge. The results of the measurement are as follows:

| | 60 c.p.s. | 1 kc. | 1 mc. |
|---|---|---|---|
| Dissipation Factor (percent) | 0.67 | 0.75 | 0.41 |
| Dielectric Constant | 3.01 | 2.96 | 2.84 |
| Volume Resistivity=8.5×10$^{15}$ ohm-cm. | | | |

From the above measurements, it can at least be concluded that the polymers of the invention possessing excellent dielectric characteristics, together with unparalleled oxidation resistance and freedom from the thermal decomposition, present a new class of resinous insulation materials.

*Example 10*

A different linear homopolymer of the invention was prepared according to the general method of Example 9 above, substituting an equivalent amount of m-bromophenol in the reaction mixture for the m-chlorophenol reactant in the same example. The reaction mixture was heated to 155° C., whereupon the phenyl ether solvent was removed by vacuum distillation and the resulting melt polymerized at this temperature for a period of approximately 80 hours. An amorphous linear solid polymer was formed in this manner with a molecular weight of 3900 by vapor pressure osmotic determination, 4000 by active hydrogen end-group analysis, and an average value of 5150 for two bromine end-group analyses. The melting characteristics exhibited by the polymer were a softening range of 70–75° C., and a flow point of 130° C.

The combined thermal stability and oxidation resistance characteristics of the unsubstituted meta-oriented phenoxylene homopolymers of the invention is surprising, especially compared with the like properties for existing para-oriented homopolymers. The present polymers undergo less than 3% by weight degradation in a nitrogen atmosphere up to about 450° C., are progressively degraded up to about 65% of the polymer weight in the temperature range 450–800° C., but do not undergo further degradation at more elevated temperatures in the range 800–900° C. While the oxidation resistance of the polymers in air does not exactly parallel the disclosed thermal stability in nitrogen, less than 3% polymer weight loss is also experienced when the materials are heated in air to 450° C. for more than an hour. This close similarity in thermal degradation and oxidation resistance is not to be found generally in other polymer systems and is not expected since the mechanisms of both processes differ radically. More particularly, the oxidation of a polymer at elevated temperatures in the range cited is an exothermic reaction in contrast to the endothermic reaction of thermal degradation. The thermal behavior of existing para-oriented homopolymers is not comparable as indicated from data for poly (2,6-dimethylphenylene-1,4) ether which proved stable for three weeks at 175° C. in a nitrogen atmosphere but underwent cross linking of the polymer and some oxidation of the alkyl side chains upon heating in oxygen at this temperature. The thermal behavior of the unsubstituted meta-oriented homopolymers of the invention indicates both chain stability as well as a low content of functional end groups and probably also reflects the substantial absence of chain branching.

The actual thermal stability measurements for the polymers of the invention were made with a sample of the coarsely ground material by heating the sample in a 000 Coors porcelain crucible on a Chevenard thermobalance at a rate of 180° C. per hour in a dry nitrogen or air atmosphere flowing at approximately 314 cc. per minute. Like results were obtained in a given atmosphere with the polymers prepared in Examples 4, 9, and 10 above so that substantially little change in thermal behavior is expected with different halogen end groups in the polymer.

From the foregoing description, it will be apparent that a novel class of meta-oriented phenoxylene homopolymers characterized by increased thermal stability at elevated temperatures has been provided together with methods for the preparation of these compositions. It is not intended to limit the invention to the preferred embodiments above shown, therefore, since it will be obvious to those skilled in the art that certain modifications of the present teaching can be made without departing from the true spirit and scope of the invention. It is intended to limit the present invention only to the scope of the following claims.

What we claim as new and desire to secure by Letters Patent of the United States is:

1. Unsubstituted linear homopolymers having a minimum molecular weight of 2000 as determined by vapor pressure osmometry and having the structural formula

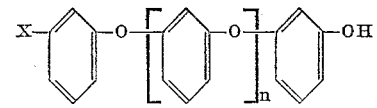

where X is a halogen atom and *n* is an integer.

2. Unsubstituted linear homopolymers having a minimum molecular weight of 2000 as determined by vapor pressure osmometry and having the structural formula

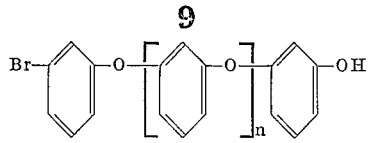

where *n* is an integer.

3. Unsubstituted linear homopolymers having a minimum molecular weight of 2000 as determined by vapor pressure osmometry and having the structural formula

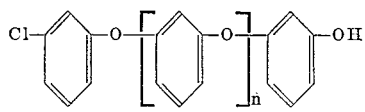

where *n* is an interger.

4. Solid unsubstituted linear homopolymers having a minimum molecular weight of 2000 as determined by vapor pressure osmometry and having the structural formula

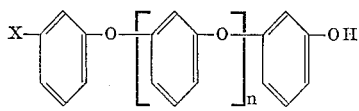

where X is a halogen atom and *n* is an integer, the homopolymer having less than 3% weight loss in air at 450° C.

5. Solid unsubstituted linear homopolymers having a minimum molecular weight of 2000 as determined by vapor pressure osmometry and having the structural formula

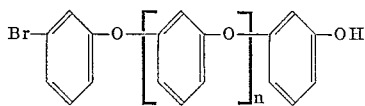

where *n* is an integer, the homopolymer having less than 3% weight loss when heated in air to 450° C.

6. Solid unsubstituted linear homopolymers having a minimum molecular weight of 2000 as determined by vapor pressure osmometry and having the structural formula

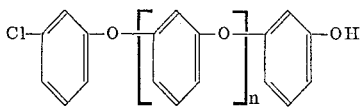

where *n* is an integer, the homopolymer having less than 3% weight loss when heated in air to 450° C.

7. A process for the preparation of a linear m-phenoxylene homopolymer which comprises heating a solution of the alkali metal salt of monohydric m-halogenophenol in an inert non-polar organic liquid under anhydrous conditions in the presence of a copper catalyst for a period of time sufficient to achieve polymerization.

8. A process for the preparation of a linear m-phenoxylene homopolymer which comprises heating a solution of the alkali metal salt of monohydric m-halogenophenol in an inert non-polar organic liquid to temperatures in the approximate range 150–220° C. under anhydrous conditions and in the presence of a copper catalyst for a period of time sufficient to achieve polymerization.

9. A process for the preparation of a linear m-phenoxylene homopolymer which comprises heating a solution of the alkali metal salt of monohydric m-halogenaophenol in an inert non-polar organic liquid under anhydrous conditions, admixing an effective amount of a copper catalyst in the solution before the solution temperature exceeds approximately 100° C. and continuing to heat the admixture to temperatures in the range 150–220° C. for a period of time sufficient to achieve polymerization.

10. A process for the preparation of a linear m-phenoxylene homopolymer which comprises (1) forming an azeotropic reaction mixture by mixing approximately stoichiometric proportions of an aqueous alkali metal hydroxide solution and a solution of monohydric m-halogenophenol in an inert non-polar low boiling azeotroping agent, (2) reacting the mixture to form the alkali metal salt of the m-halogenophenol under heating conditions whereby essentially all water is removed, (3) adding an inert non-polar high boiling solvent to the mixture, and (4) polymerizing the alkali metal salt of the m-halogenophenol under anhydrous conditions with continued heating to temperatures in the range 150–220° C. in the presence of an effective amount of a copper catalyst added before the mixture temperature substantially exceeds the boiling point of the azeotropic reaction mixture.

11. A process for the preparation of a linear m-phenoxylene homopolymer which comprises heating a mass of the alkali metal salt of monohydric m-halogenophenol to temperatures in the approximate range 150–200° C. under anhydrous conditions and in the presence of effective amounts of a copper catalyst.

References Cited by the Examiner
UNITED STATES PATENTS 3,134,753   5/1964   Kwiatek _____ 260—47

FOREIGN PATENTS 1,238,643   7/1960   France.

OTHER REFERENCES

Aftergut et al., Chemistry and Industry (London), Aug. 29, 1959, pp. 1090–1091.

Hay, S.N. 744,086 (abandoned), filed June 24, 1958, pp. 7 and 49.

Brown et al., J. Chem Eng. Data, 6, pp. 125–7 (1961).

S.C.I. Monograph No. 13, pp. 231–246 (1961), pp. 7 and 49.

WILLIAM H. SHORT, *Primary Examiner.*

JOSEPH R. LIBERMAN, *Examiner.*

J. C. MARTIN, *Assistant Examiner.*